United States Patent
Layouni et al.

(10) Patent No.: US 11,935,335 B2
(45) Date of Patent: Mar. 19, 2024

(54) ROBUST PHYSICAL AND VIRTUAL IDENTITY ASSOCIATION

(71) Applicant: GM Global Technology Operations LLC, Detroit, MI (US)

(72) Inventors: Mohamed A. Layouni, Fraser, MI (US); Bo Yu, Troy, MI (US); Markus Jochim, Troy, MI (US)

(73) Assignee: GM GLOBAL TECHNOLOY OPERATIONS LLC, Detroit, MI (US)

( * ) Notice: Subject to any disclaimer, the term of this patent is extended or adjusted under 35 U.S.C. 154(b) by 325 days.

(21) Appl. No.: 17/578,834

(22) Filed: Jan. 19, 2022

(65) Prior Publication Data

US 2023/0230422 A1 Jul. 20, 2023

(51) Int. Cl.
| | |
|---|---|
| G07C 5/00 | (2006.01) |
| B60R 16/023 | (2006.01) |
| G07C 5/04 | (2006.01) |
| H04W 4/46 | (2018.01) |
| H04W 56/00 | (2009.01) |
| H04L 9/40 | (2022.01) |
| H04W 12/033 | (2021.01) |

(52) U.S. Cl.
CPC ............ *G07C 5/008* (2013.01); *B60R 16/023* (2013.01); *G07C 5/04* (2013.01); *H04W 4/46* (2018.02); *H04W 56/002* (2013.01); *H04L 63/0435* (2013.01); *H04W 12/033* (2021.01)

(58) Field of Classification Search
CPC ........ G07C 5/008; G07C 5/04; B60R 16/023; H04W 4/46; H04W 56/002; H04W 12/033; H04L 63/0435
See application file for complete search history.

(56) References Cited

U.S. PATENT DOCUMENTS

2023/0132804 A1* 5/2023 Chen ...................... A63F 13/73
705/14.12

FOREIGN PATENT DOCUMENTS

| CN | 116017368 A | * 10/2021 | |
| WO | WO 2019110247 | * 11/2018 | ............. H04L 67/12 |
| WO | WO 2020260339 | * 6/2020 | ............. H04W 4/40 |

* cited by examiner

*Primary Examiner* — Hongmin Fan
(74) *Attorney, Agent, or Firm* — Vivacqua Crane, PLLC

(57) ABSTRACT

A system within an ego vehicle for robust association of a physical identity and a virtual identity of a target vehicle includes a data processor, including a wireless communication module and a visible light communication module, positioned within an ego vehicle, and a plurality of perception sensors, positioned within the ego vehicle and adapted to collect data related to a physical identity of the target vehicle and to communicate the data related to the physical identity of the target vehicle to the data processor via a communication bus, the data processor within the ego vehicle adapted to receive, via a wireless communication channel, data related to a virtual identity of the target vehicle, associate the physical identity of the target vehicle with the virtual identity of the target vehicle, and initiate, via the wireless communication channel and a visible light communication channel, a challenge-response protocol between the ego vehicle and the target vehicle.

20 Claims, 4 Drawing Sheets

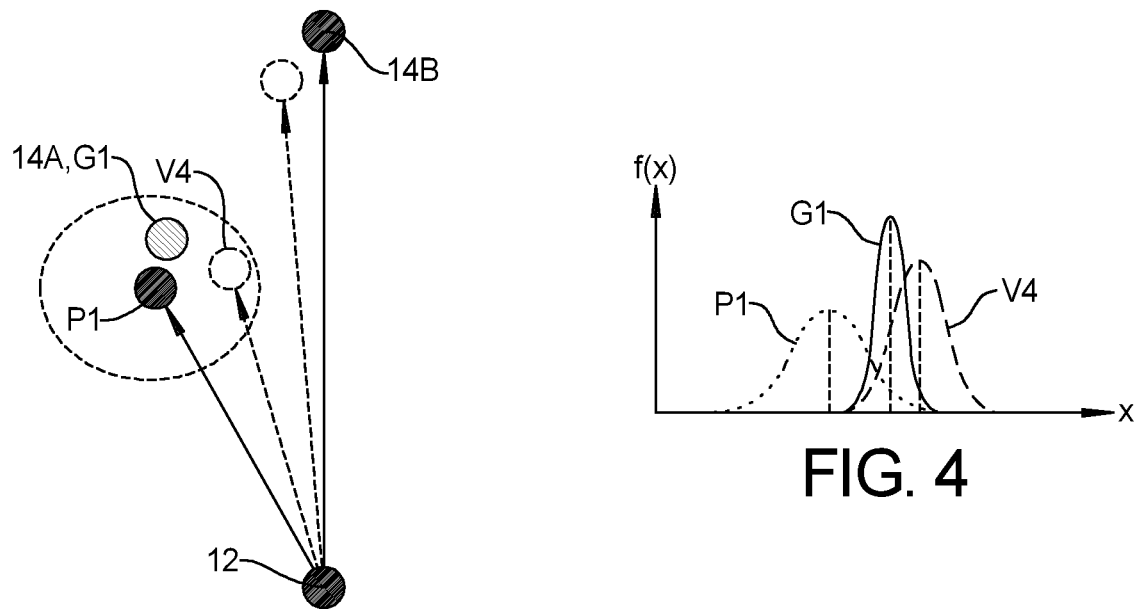
FIG. 3
FIG. 4
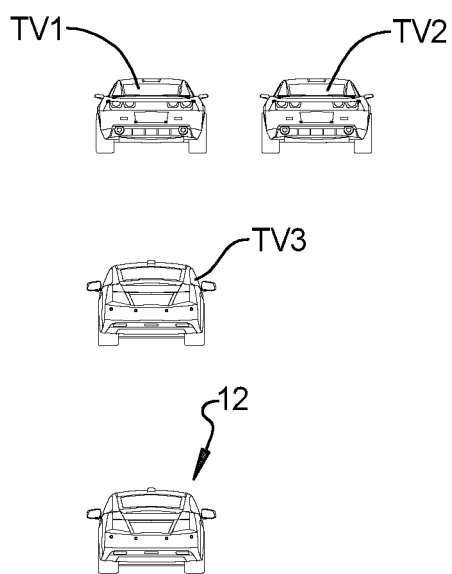
FIG. 5

ROBUST PHYSICAL AND VIRTUAL IDENTITY ASSOCIATION

INTRODUCTION

The present disclosure relates to a system and method for robust association of a physical identity of a target vehicle that is detected by perception sensors within an ego vehicle to a virtual identity of the target vehicle that is received via wireless communication between the ego vehicle and the target vehicle.

In current systems, an ego vehicle using wireless vehicle to vehicle or vehicle to infrastructure communication channels receives information transmitted from a target vehicle that includes identification information about the target vehicle to allow the ego vehicle to identify the target vehicle. This information provides a virtual identity of the target vehicle. This allows the ego vehicle to locate the position of the target vehicle relative to the ego vehicle so the ego vehicle can take actions such as collaborative maneuvering and positioning and infrastructure coordination. Often, such wireless communication channels are visible to others, and susceptible to interception by third parties.

In addition, an ego vehicle will use perceptions sensors, such as lidar, radar and cameras, positioned within the ego vehicle to identify objects, such as target vehicles that are in proximity to the ego vehicle. This provides a physical identity of detected target vehicles. Often, the perception sensors of the ego vehicle may detect multiple target vehicles. Current systems generally trust the virtual identity information received, without confirming that the virtual identity information received is correlated to the correct physical identity information. In other words, current systems do not verify that information transmitted wirelessly corresponds to the correct one of multiple target vehicles physically identified by the ego vehicle.

In addition, the use of wireless communication channels and visible light channels for wireless communications leaves open the opportunity for a third party to intercept such communications and pose as a target vehicle, providing false information to the ego vehicle. When a third party vehicle is positioned between an ego vehicle and a target vehicle, the third party vehicle blocks visible identification of the target vehicle by the ego vehicle. In this circumstance, the third party vehicle may intercept visible light channel communications from the target vehicle, and re-transmits the visible light channel communication to the ego vehicle, pretending to be the target vehicle.

Thus, while current systems achieve their intended purpose, there is a need for a new and improved system and method for robust association of a physical identity of a target vehicle that is detected by perception sensors within an ego vehicle to a virtual identity of the target vehicle that is received via wireless communication between the ego vehicle and the target vehicle that prevents a third party from providing false information to the ego vehicle.

SUMMARY

According to several aspects of the present disclosure, a method of robust association of a physical identity and a virtual identity of a target vehicle by an ego vehicle includes collecting, with a plurality of perception sensors within the ego vehicle, data related to a physical identity of the target vehicle and communicating data related to the physical identity of the target vehicle, via a communication bus, to a data processor within the ego vehicle, collecting, with the data processor within the ego vehicle, via a wireless communication channel, data related to a virtual identity of the target vehicle, associating, with the data processor within the ego vehicle, the physical identity of the target vehicle with the virtual identity of the target vehicle, and initiating, with the data processor within the ego vehicle, via the wireless communication channel and a visible light communication channel, a challenge-response protocol between the ego vehicle and the target vehicle.

According to another aspect, the initiating, with the data processor, via the wireless communication channel and the visible light communication channel, a challenge-response protocol between the ego vehicle and the target vehicle further includes sending, with the data processor within the ego vehicle, via the wireless communication channel, a challenge to the target vehicle, sending, with a data processor within the target vehicle, via the wireless communication channel, an intended time of response to the challenge to the ego vehicle, and sending, with the data processor within the target vehicle, via the visible light communication channel, a response to the ego vehicle.

According to another aspect, the method further includes synchronizing, with the data processor within the ego vehicle and the data processor within the target vehicle, a clock within the ego vehicle with a clock within the target vehicle.

According to another aspect, the method further includes, after synchronizing the clock within the ego vehicle with the clock within the target vehicle, dividing a timeline into timeslots having a predetermined length, wherein the sending, from the target vehicle to the ego vehicle, via the wireless communication channel, an intended time of response to the challenge further includes identification, by the target vehicle, of a timeslot within which the response to the challenge will be sent.

According to another aspect, the sending, with a data processor within the target vehicle, via the wireless communication channel, an intended time of response to the challenge to the ego vehicle, further includes sending, with a data processor within the target vehicle, via the wireless communication channel, information related to the current position and movement of the target vehicle to the ego vehicle, the method further including, at the intended time of response: estimating, with the data processor of the ego vehicle, the position of the target vehicle, identifying, with the perception sensors on the ego vehicle, the physical identity of the target vehicle based on the estimated position of the target vehicle, and verifying, with the data processor within the ego vehicle, that the response from the target vehicle matches an expected response.

According to another aspect, the challenge sent by the ego vehicle and the response sent by the target vehicle are encrypted with a session key using symmetric key encryption.

According to another aspect, the challenge sent by the ego vehicle and the response sent by the target vehicle are encrypted with public key encryption.

According to another aspect, the sending, with the data processor within the target vehicle, via the wireless communication channel, an intended time of response to the challenge to the ego vehicle is executed following the sending, with the data processor within the ego vehicle, via the wireless communication channel, the challenge to the target vehicle.

According to another aspect, the sending, with the data processor within the target vehicle, via the wireless communication channel, an intended time of response to the challenge to the ego vehicle is executed prior to the sending, with the data processor within the ego vehicle, via the wireless communication channel, the challenge to the target vehicle.

According to several aspects of the present disclosure, a system within an ego vehicle for robust association of a physical identity and a virtual identity of a target vehicle, includes a data processor, including a wireless communication module and a visible light communication module, positioned within an ego vehicle, and a plurality of perception sensors, positioned within the ego vehicle and adapted to collect data related to a physical identity of the target vehicle and to communicate the data related to the physical identity of the target vehicle to the data processor via a communication bus, the data processor within the ego vehicle adapted to receive, via a wireless communication channel, data related to a virtual identity of the target vehicle, associate the physical identity of the target vehicle with the virtual identity of the target vehicle, and initiate, via the wireless communication channel and a visible light communication channel, a challenge-response protocol between the ego vehicle and the target vehicle.

According to another aspect, when initiating, with the data processor, via the wireless communication channel and the visible light communication channel, a challenge-response protocol between the ego vehicle and the target vehicle the data processor within the ego vehicle is further adapted to send, via the wireless communication channel, a challenge to the target vehicle, and a data processor within the target vehicle is adapted to send, via the wireless communication channel, an intended time of response to the challenge to the ego vehicle, and send, via the visible light communication channel, a response to the ego vehicle.

According to another aspect, the data processor within the ego vehicle and the data processor within the target vehicle are adapted to synchronize a clock within the ego vehicle with a clock within the target vehicle.

According to another aspect, the data processor within the ego vehicle, after synchronizing the clock within the ego vehicle with the clock within the target vehicle, is further adapted to divide a timeline into timeslots having a predetermined length, wherein when sending, via the wireless communication channel, an intended time of response to the challenge, the data processor within the target vehicle is further adapted to identify a timeslot within which the response to the challenge will be sent.

According to another aspect, when sending, via the wireless communication channel, an intended time of response to the challenge, the data processor within the target vehicle is further adapted to send, via the wireless communication channel, information related to the current position and movement of the target vehicle to the ego vehicle, and, at the intended time of response, the data processor within the ego vehicle is further adapted to estimate the position of the target vehicle, identify, with the perception sensors on the ego vehicle, the physical identity of the target vehicle based on the estimated position of the target vehicle, and verify that the response from the target vehicle matches an expected response.

According to another aspect, the challenge sent by the ego vehicle and the response sent by the target vehicle are encrypted with session key encryption.

According to another aspect, the challenge sent by the ego vehicle and the response sent by the target vehicle are encrypted with public key encryption.

According to another aspect, the data processor within the target vehicle is adapted to send, via the wireless communication channel, an intended time of response to the challenge to the ego vehicle after the data processor within the ego vehicle sends, via the wireless communication channel, the challenge to the target vehicle.

According to another aspect, the data processor within the target vehicle is adapted to send, via the wireless communication channel, an intended time of response to the challenge to the ego vehicle prior to the data processor within the ego vehicle sending, via the wireless communication channel, the challenge to the target vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3, is a schematic diagram illustrating the relationship of the identified physical identity, the received virtual identity, and the actual position of a target vehicle relative to an ego vehicle;

FIG. 4 is a probability distribution graph of the physical identity, the virtual identity and the actual position of a target vehicle;

FIG. 5 is a schematic illustration of a scenario where an imposter vehicle may intercept a virtual transmission from a target vehicle;

Figure 1:
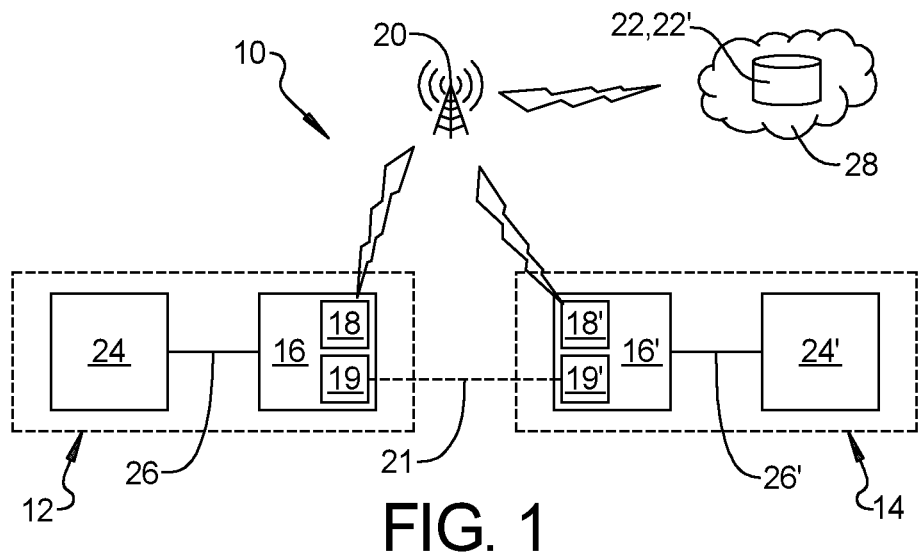
FIG. 1 is a schematic diagram of a system for robust association of a physical identity and a virtual identity of a target vehicle in accordance with an exemplary embodiment of the present disclosure.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Referring to FIG. 1, a system 10 within an ego vehicle 12 for robust association of a physical identity and a virtual identity of a target vehicle 14 includes a data processor 16 that includes a wireless communication module 18 and a visible light communication module 19, positioned within the ego vehicle 12.

The data processor 16 is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

The data processor 16 includes a wireless communication module 18 that is adapted to allow wireless communication between the ego vehicle 12 and other vehicles or other external sources. The data processor 12 is adapted to collect information from databases 22 via a wireless data communication network 20 over wireless communication channels such as a WLAN, 4G/LTE or 5G network, or the like. Such databases 22 can be communicated with directly via the internet, or may be cloud-based databases. Information that may be collected by the data processor 16 from such external sources includes, but is not limited to road and highway databases maintained by the department of transportation, a global positioning system, the internet, other vehicles via V2V communication networks, traffic information sources, vehicle-based support systems such as OnStar, etc.

The data processor 16 further includes a visible light communication module that allows wireless, via visible light, communication between the ego vehicle 12 and other vehicles. Visible light communication (VLC), or LIFI, is a data communication technology that uses a visible light source as a signal transmitter, the air as a transmission medium or channel and a signal receiving device. Generally, the transmitters are Light Emitting Diodes (LEDs) while the principal device of the receiver is a photodetector, usually a photodiode.

The wireless communication module 18 and the visible light communication module 19, enable bi-directional communications between the data processor 16 of the ego vehicle 12 and a data processor 16', equipped with a wireless communication module 18' and a visible light communication module 19', within the target vehicle 14. The wireless communication module 18 and the visible light communication module 19, also enable bi-directional communications between the data processor 16 of the ego vehicle 12 and other vehicles, mobile devices and infrastructure for the purpose of triggering important communications and events.

The system 10 further includes a plurality of perception sensors 24, positioned within the ego vehicle 12. The plurality of perception sensors 24 includes sensors adapted to collect data related to a physical identity of the target vehicle 14. Such sensors 24 include, but are not limited to, Radar, Lidar and cameras, that allow the ego vehicle to "see" nearby objects. The plurality of perception sensors 24 communicate the data related to the physical identity of the target vehicle 14 to the data processor 16 via a communication bus 26 within the ego vehicle 12.

The data processor 16 is further adapted to receive, via a wireless communication channel 20, data related to a virtual identity of the target vehicle 14 and to associate the physical identity of the target vehicle 14 with the virtual identity of the target vehicle 14. The target vehicle 14 includes a plurality of perception sensors 24' located within the target vehicle 14 and a data processor 16' that is equipped with a wireless communication module 18'. The plurality of perception sensors 24' communicate with the data processor 16' via a communication bus 26' within the target vehicle 14.

The wireless communication module 18' within the target vehicle 14 allows the target vehicle 14 to transmit data related to a virtual identity of the target vehicle 14 to the ego vehicle 12 via the wireless communication network 20.

Figure 2:
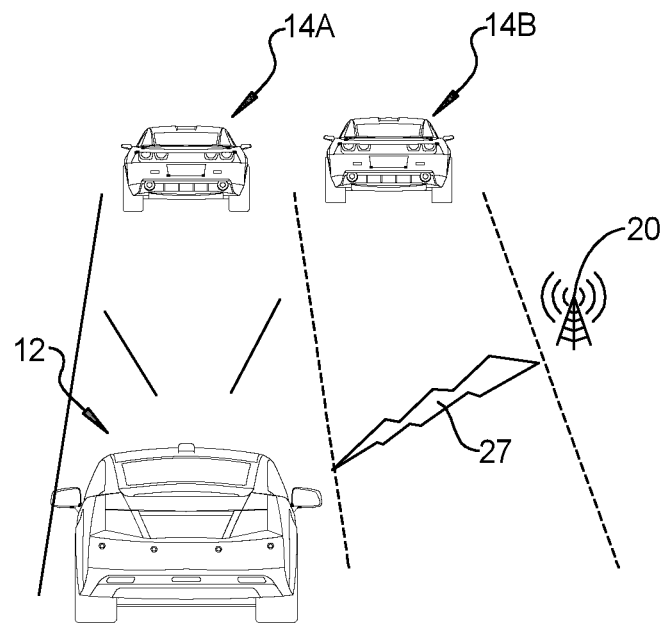
FIG. 2 is a schematic illustration of an application of the system of the present disclosure wherein an ego vehicle is associating a physical and virtual identity for each of two target vehicles.

Referring to FIG. 2, in an example scenario, the plurality of perception sensors 24 within an ego vehicle 12 detect a first target vehicle 14A and a second target vehicle 14B in proximity to the ego vehicle 12. The ego vehicle 12 also wirelessly receives data related to a virtual identity of the first target vehicle 14A, as indicated at 27. Such virtual identity data may include, but is not limited to information such as an IP address, vin number, plate number, GPS coordinates, etc. However, the first and second target vehicle 14A, 14B may both be of the same model and the same color, making it difficult for the ego vehicle 12 to properly associate the virtual identity information to the correct one of the first and second target vehicles 14A, 14B. It is important that the ego vehicle 12 properly associate the virtual identity to the correct one of the first and second target vehicles 14A, 14B.

For the ego vehicle 12 to effectively and safely make decisions on lane changes, speed adjustments and other such maneuvers, it is important that the ego vehicle 12 correctly associate the virtual identity to the correct physical identity, ie. the correct one of the first and second target vehicles 14A, 14B. This way, the ego vehicle 12 will ensure it is communicating with the correct one of the first and second target vehicles 14A, 14B. In addition, the ego vehicle 12 may receive virtual identity data from each of the first and second target vehicles 14A, 14B. Proper association of virtual and physical identities will ensure the ego vehicle 12 can know what virtual data to associate with which one of the first and second target vehicles 14A, 14B.

In an exemplary embodiment, when associating the physical identity of the target vehicle 14 with the virtual identity of the target vehicle 14, the data processor 16 is further adapted to leverage a Bayesian Inference Model and estimate a probability that the data related to the physical identity and the data related to the virtual identity are for the same target vehicle 14. In other words, the data processor 16 uses a Bayesian Inference Model to match the data received from the target vehicle 14 to the physical observations of the ego vehicle 12.

When leveraging a Bayesian Inference Model, the data processor 16 builds a two-dimensional discrete probability distribution table, such as:

|   | $V_1$ | ... | $V_i$ | ... | $V_m$ |
|---|---|---|---|---|---|
| $P_j$ | $p_{j,1}$ | ... | $p_{j,i}$ | ... | $p_{j,m}$ | where $\Sigma p_{i,j}=1$.

There are m virtual identities ($V_1 \ldots V_m$) and n physical identities ($P_1 \ldots P_n$). $P_{i,j}$ is the probability that $P_j$ is matched to $V_i$. For each physical identity, such a state model is created, multiple such state models for all physical identities will form a two-dimensional table.

A Baye's theorem is given by:

$$P(h|D) = \frac{P(D|h)*P(h)}{P(D)},$$

where D represents data and h represents a hypothesis. The calculation is given:

$$P(h_{j,i}|D) = \frac{P(D|h_{j,i})*P(h_{j,i})}{P(D)}, \text{ and}$$

$$P(D) = \sum_{j,i} P(D|h_{j,i})*P(h_{j,i}),$$

where
D represents two sets of sensor observations (physical and virtual);
$H_{i,j}$ represents the hypothesis that Physical j is matched to Virtual i;
$P(D|h_{j,i})$ is sensor data for a given hypothesis, or the likelihood probability distribution of observing the two sets of observation data given the hypothesis;

$P(h_{j,i})$ is a prior hypothesis, or the prior probability distribution of the hypothesis (the state definition at t−1). At the beginning, $$P(h_{j,i}) = \frac{1}{m}.$$

If there are ten target vehicles identified, initially, each probability would be 10%, then would be updated;
P(D) is the evidence probability of two sets of sensor observations; and
$P(h_{j,i}|D)$ is the posterior hypothesis, or the posterior probability distribution of the hypothesis (the state at t). Use sensor observation data to update the state table (hypothesis), as new data comes, the state table is updated to represent the more accurate likelihood that one physical identity is matched to a virtual identity.

A Bayesian Inference Algorithm is as follows:
Step 1: Collect sensor data from two sources. From local perception sensors (physical), and from a wireless communication channel 20 (virtual).
Step 2: Create or update the two-dimensional state table (create new rows/columns if new identities are detected, delete rows/columns in an identity is no longer present). If a new row is created, the columns in the new row are initialized to $$P(h_{j,i}) = \frac{1}{m}.$$

Step 3: Use the state table as the prior probability distribution, $P(h_{j,i})$.
Step 4: Use the sensor data to calculate $P(D|h_{j,i})$ and $P(D)$.
Step 5: Update the posterior probability distribution, $P(h_{j,i}|D)$.
Step 6: $P(h_{j,i}|D)$ is used to update the two-dimensional state table.
Step 7: In the state table, find the maximal probability of hypothesis (j,i) as the algorithm's current output, i.e. physical identity i with a probability $p_{j,i}$.
Step 8: return to Step 1.

In one exemplary embodiment, when associating the physical identity of the target vehicle 14 with the virtual identity of the target vehicle 14, the data processor is further adapted to use the data related to the physical identity of the target vehicle 14 to determine a relative position of the target vehicle 14, and to estimate a real-time status of the target vehicle 14. The data related to the physical identity of the target vehicle 14 includes global satellite positioning coordinates, speed, acceleration, yaw and heading, and the data related to the virtual identity of the target vehicle 14 includes global satellite positioning coordinates, speed, acceleration, yaw and heading.

In this embodiment, the target vehicle 14 transmits only basic safety information, including global satellite positioning coordinates, speed, acceleration, yaw and heading. The ego vehicle 12 uses the plurality of perception sensors 24 to determine one or more target vehicle's relative position and estimate its real-time status, i.e. global satellite positioning coordinates, speed, acceleration, yaw and heading. The ego vehicle 12 receives one or more target vehicle's basic safety information, and the data processor within the ego vehicle 12 runs the Bayesian Inference Algorithm and calculates $P(D|h_{j,i})$ and $P(D)$.

Referring to FIG. 3, an example is shown where an ego vehicle 12 detects with the plurality of perception sensors a first target vehicle 14A and a second target vehicle 14B. For the first target vehicle 14A, the vehicle's position (physical identity), as indicated at P1, is observed by the ego vehicle's perception sensors 24 (camera). The GPS position (virtual identity) of the first target vehicle 14A, as indicated at V4, is reported from the first target vehicle 14A via a wireless communication channel. In a hypothesis, $h_{1,4}$, P1 and V4 are the same identity, while the group truth location of the first target vehicle is indicated at 14A. In other words, P1 and V4 are the same observations of 14A from two sets of sensors. Then, using sensor fusion the ground truth, G1, probability distribution can be estimated. The G1 distribution can be calculated using a second set of Bayesian Inference Model.

Referring to FIG. 4, a graph is shown illustrating the probability distributions of P1, V4 and G1, where:

$$P(D \mid h_{1,4}) = G_1(P_1) * G_v(V_4), \text{ and}$$

$$P(D) = \sum_{j,i} P(D \mid h_{j,i}) * P(h_{j,i}).$$

Referring to FIG. 5, in another example scenario, the plurality of perception sensors 24 within an ego vehicle 12 detect a second target vehicle TV2 and a third target vehicle TV3. A view of a first target vehicle TV1 is blocked, so the ego vehicle cannot physically perceive the first target vehicle TV1. The ego vehicle 12 does, however, wirelessly receive data related to a virtual identity of the first target vehicle TV1. It is possible, that the third target vehicle TV3 can intercept the virtual information from the first target vehicle TV1 and the third target vehicle TV3 may masquerade as the first target vehicle TV1. Additionally, the third target vehicle TV3 may collude with the second target vehicle TV2 to help the second target vehicle TV2 masquerade as the first target vehicle TV1. Thus, the ego vehicle initiates, via the wireless communication channel and a visible light communication channel, a challenge-response protocol between the ego vehicle and the target vehicle to verify that the association of physical identity and virtual identity of the first target vehicle TV1 is valid. If the challenge-response protocol is answered correctly, the ego vehicle 12 accepts it's association of physical and virtual identities for the first target vehicle TV1. If the challenge-response protocol is answered incorrectly, the ego vehicle 12 disregards its' association of physical and virtual identities for the first target vehicle TV1.

Figure 6:
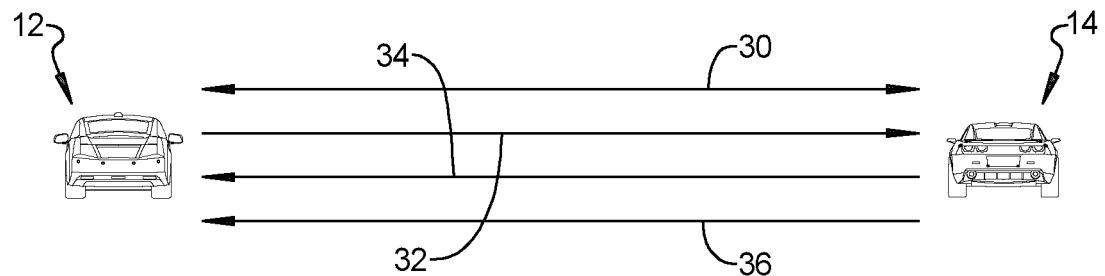
FIG. 6 is a schematic diagram illustrating the stream of communication between an ego vehicle and a target vehicle during a challenge-response protocol.

Referring to FIG. 6, an ego vehicle 12 and a target vehicle 14 exchange information via a wireless communication network 20, as indicated at 30, wherein the ego vehicle 12 receives information related to a virtual identity for the target vehicle 14. When the data processor 16 within the ego vehicle initiates, via the wireless communication channel and the visible light communication channel, a challenge-response protocol between the ego vehicle 12 and the target vehicle 14, the data processor 16 within the ego vehicle 12 sends, via the wireless communication channel, a challenge to the target vehicle, as indicated at 32. The challenge is given as Hash(Ego Vehicle ID, Target Vehicle ID, Randomness from Ego Vehicle, Session ID), and is encrypted to make it difficult to decipher by an unauthorized party.

When the data processor 16' within the target vehicle 14 receives the challenge, the data processor 16' within the target vehicle 14 is adapted to send, via the wireless communication channel 20, an intended time of response to the challenge to the ego vehicle 12, as indicated at 34, and to send, via a visible light communication channel, a response to the ego vehicle 12, as indicated at 36.

Prior to initiating, via the wireless communication channel 20 and the visible light communication channel, a challenge-response protocol between the ego vehicle 12 and the target vehicle 14, the data processor 16 within the ego vehicle 12 and the data processor 16' within the target vehicle 14 are adapted to synchronize a clock within the ego vehicle 12 with a clock within the target vehicle 14. It should be understood that the clock within the ego vehicle 12 and the clock within the target vehicle 14 are references to built-in time tracking capability of each of the respective data processors 16, 16'. This is important to ensure that the vehicles have the same understanding of the time, since, as described below, timing of the response send by the target vehicle is critical.

Once the time has been synchronized between the data processor 16 of the ego vehicle 12 and the data processor 16' of the target vehicle 14, the data processor 16 within the ego vehicle is further adapted to divide a timeline into timeslots 38 having a predetermined length. When the target vehicle 14 sends an intended time of response to the challenge, the data processor 16' within the target vehicle 14 is further adapted to identify an individual timeslot 38 within which the response to the challenge will be sent. In addition, the target vehicle 14 is further adapted to send, via the wireless communication channel 20, information related to the current position, i.e. GPS coordinates, and movement, i.e. speed, acceleration and yaw, of the target vehicle 14 to the ego vehicle 12.

The response to the challenge must be received within the timeslot 38 identified by the target vehicle 14. The pre-determined length of the timeslot 38 is carefully calculated to allow sufficient time for the target vehicle 14 to send the response, while being short enough that there is not enough time for another vehicle to intercept, read, and re-broadcast the response. This will prevent a different vehicle from intercepting the response and pretending to be the target vehicle 14.

Figure 7:
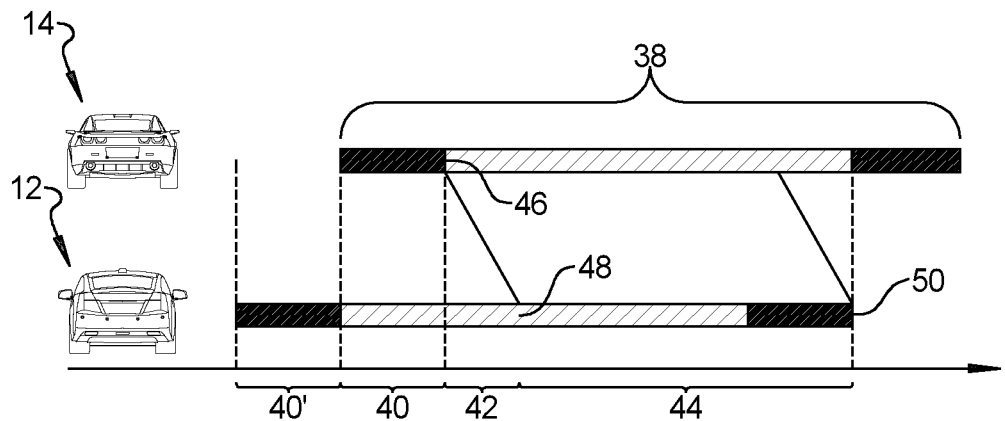
FIG. 7, is a timeline illustrating the transmission of a response from a target vehicle to an ego vehicle.

Referring to FIG. 7, a timeline of the transfer of a response by the target vehicle 14 is shown. In an exemplary embodiment, the pre-determined length of the timeslot 38 is given as TS=2×guard+T-data, where, guard is the length of time equal to the maximum synchronization error between the clock of the ego vehicle 12 and the clock of the target vehicle 14, as indicated at 40, and T-data is given as T-data=TOF+Data Length, where TOF is the time of flight, or the time necessary for the response to travel from the target vehicle 14 to the ego vehicle 12, as indicated at 42, and Data Length, is the time necessary to transmit the data, as indicated at 44.

As shown in FIG. 7, at the beginning of the indicated timeslot 38, the ego vehicle 12 starts a countdown of the pre-determined length of the timeslot 38. As shown, a synchronization error (guard) is taken into consideration, as shown at 40'. At the beginning of the timeslot 38, according to the clock within the target vehicle 14, taking into consideration the guard 40', the target vehicle 14 sends the response. Again, taking into consideration a maximum synchronization error (guard) 40, the transfer of the response actually begins at 46. The time of flight, TOF, as indicated at 42 is the time it takes for the response to reach the ego vehicle 12. The ego vehicle 12 begins to receive the response at point 48. The time it takes to transmit the entire response is the Data Length, as indicated at 44. The ego vehicle 12 has received the entire response at point 50, and within the pre-determined length of time of the time slot 38.

Figure 8:
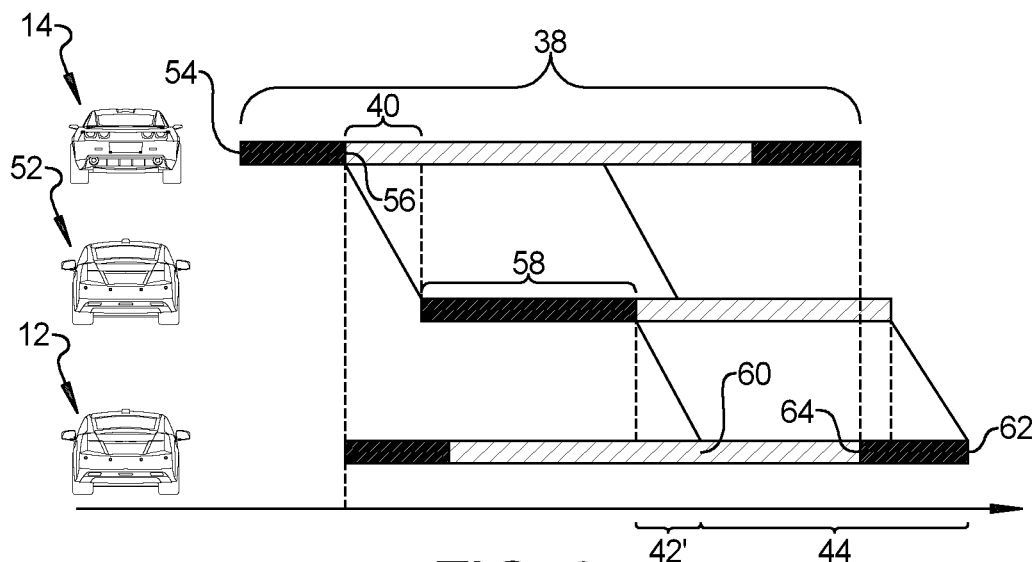
FIG. 8 is a timeline illustrating the transmission of a response from a target vehicle that is intercepted by an imposter vehicle before being rebroadcast to an ego vehicle.

Referring to FIG. 8, a scenario is illustrated where an imposter vehicle 52 is attempting to intercept a response sent by the target vehicle 14. At point 54, the beginning of the identified time slot 38, the target vehicle 14 begins transmitting the response to the ego vehicle 12. Accounting for the guard 40, actual transmission of the response begins at point 56. The time of flight, TOF, as indicated at 42 is the time it takes for the response to reach the ego vehicle 12, except, the response is intercepted by the imposter vehicle 52. The time it takes for the imposter vehicle 52 de-crypt, read and re-broadcast the response (Relay Time) is indicated at 58. Once the imposter vehicle 52 has read and re-broadcast the response, the time of flight, TOF, as indicated at 42' is the time it takes for the response to reach the ego vehicle 12. The ego vehicle 12 begins to receive the response at point 60. The time it takes to transmit the entire response is the Data Length, as indicated at 44. The ego vehicle 12 has received the entire response at point 62, which is outside the pre-determined length of time for the time slot 38. In order to be acceptable, the ego vehicle 12 would have needed to receive the entire response at point 64, or earlier. Since the response was received outside the pre-determined time slot 38, the ego vehicle 12 will dis-regard the response and assume that the association of the physical and virtual identities of the target vehicle 14 is incorrect.

To prevent relay attacks by an imposter vehicle, the following must hold true:

guard+T-data≤2×TOF+Relay Time+Data Length; and

TOF+Data Length≤T-data≤2×TOF+Relay Time+Data Length−guard.

The above inequalities only hold true when:

TOF+Relay Time−guard≥0; and

Guard≤(TOF+Relay Time).

At the intended time of response, the data processor 16 within the ego vehicle 12 is further adapted to estimate the position of the target vehicle 14 using the position and movement information previously sent by the target vehicle 14. Simultaneously, the data processor 16 within the ego vehicle 12 identifies, with the perception sensors 24, the physical identity of the target vehicle 14 based on the estimated position of the target vehicle 14. Finally, the data processor 16 of the ego vehicle 12 verifies that the response from the target vehicle 14 matches an expected response. If the response matches, and the response is received within the identified time slot 38, then the ego vehicle 12 can verify that it has properly associated the virtual and physical identities of the target vehicle 14.

To further prevent an imposter from interfering, the challenge and the response exchanged between the ego vehicle 12 and the target vehicle 14 are encoded. For example:

Challenge=Hash(Ego ID,Target Vehicle ID,Randomness from Ego Vehicle,Session ID); and Response=KDF(SessionKey,Challenge,t-start,t-end), where KDF is a Key Derivative Function, and [t-start, t-end] is the predetermined timeslot 38 for sending the response.

In one exemplary embodiment, the challenge sent by the ego vehicle 12 and the response sent by the target vehicle 14 are encrypted with session key encryption. Session key is an encryption and decryption key that may be randomly generated to ensure the security of a communications session between two vehicles. Session keys may also be generated using deterministic processes (Key Establishment protocols) such as Diffie-Hellman which is a Public Key protocol where both parties use their respective public key pairs along with their respective random input. Session keys are sometimes called symmetric keys because the same key is used for both encryption and decryption. A The session key is used for only one session. It is then discarded, and a new key is randomly generated for the next session. The session key itself is a secret that can be used either with symmetric or public key encryption algorithms. In practice, however, session keys are used for symmetric key encryption purposes a vast majority of the time.

In another exemplary embodiment, the challenge sent by the ego vehicle and the response sent by the target vehicle are encrypted with public key encryption. Public keys or asymmetric encryption, by contrast to symmetric key encryption, use two keys, a public key and a private key, rather than a single key to secure data communication between two parties over an open network.

Figure 9:
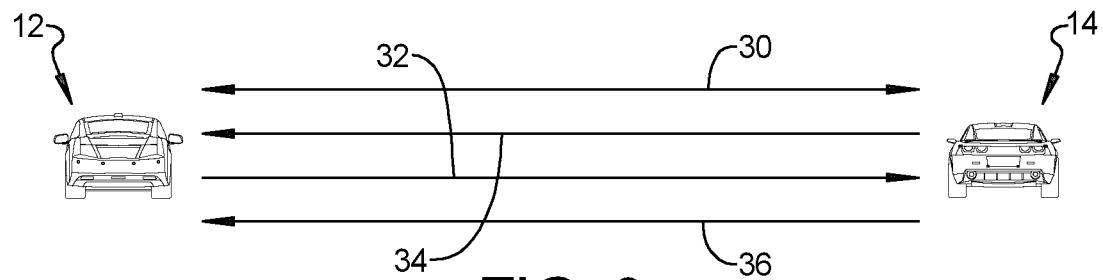
FIG. 9 is a schematic diagram illustrating the stream of communication between an ego vehicle and a target vehicle during a challenge-response protocol according to an alternate embodiment.

Referring again to FIG. 6, in the exemplary embodiment shown, the data processor 16' within the target vehicle 14 is adapted to send, via the wireless communication channel 20, an intended time of response to the challenge to the ego vehicle 12, as indicated at 34, after the data processor 16 within the ego vehicle 12 sends, via the wireless communication channel, a challenge to the target vehicle 14, as indicated at 32. Referring to FIG. 9, alternatively, in another exemplary embodiment, the data processor 16' within the target vehicle 14 is adapted to send, via the wireless communication channel 20, an intended time of response to the challenge to the ego vehicle 12, as indicated at 34, before the data processor 16 within the ego vehicle 12 sends, via the wireless communication channel, a challenge to the target vehicle 14, as indicated at 32. In this way, the target vehicle 14 provides the identified timeslot 38 to the ego vehicle 12, before a potential imposter vehicle has a chance to intercept the challenge and potentially break any encryption. The ego vehicle 12 can wait until the identified timeslot 38 is near before sending the challenge, reducing the amount of time that a potential imposter will have to break any encryption, read and rebroadcast, thus reducing the likelihood that an imposter can successfully intercept and impersonate the target vehicle 14.

Figure 10:
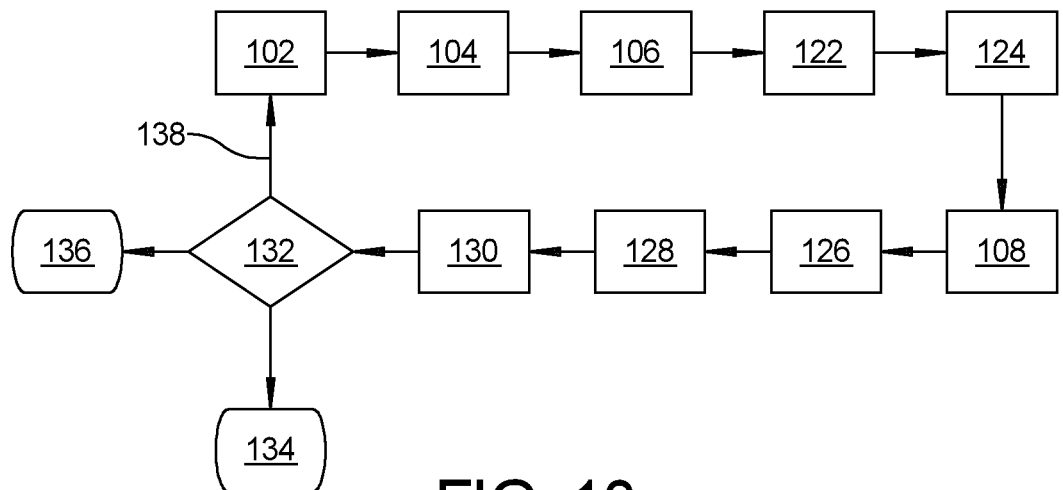
FIG. 10 is a schematic flow chart illustrating a method of using a system for robust association of a physical identity and a virtual identity of a target vehicle.

Referring to FIG. 10, a method 100 of robust association of a physical identity and a virtual identity of a target vehicle 14 by an ego vehicle 12, includes, starting at block 102, collecting, with a plurality of perception sensors 24 within the ego vehicle 12, data related to a physical identity of the target vehicle 14 and communicating data related to the physical identity of the target vehicle 14, via a communication bus 26, to a data processor 16 within the ego vehicle 12. Moving to block 104, the method 100 includes collecting, with the data processor 16 within the ego vehicle 12, via a wireless communication channel 20, data related to a virtual identity of the target vehicle 14. Moving to block 106, the method 100 includes associating, with the data processor 16 within the ego vehicle 12, the physical identity of the target vehicle 14 with the virtual identity of the target vehicle 14.

Moving to block 108, the method 100 includes initiating, with the data processor 16 within the ego vehicle 12, via the wireless communication channel 20 and a visible light communication channel 21, a challenge-response protocol between the ego vehicle 12 and the target vehicle 14.

Figure 11:
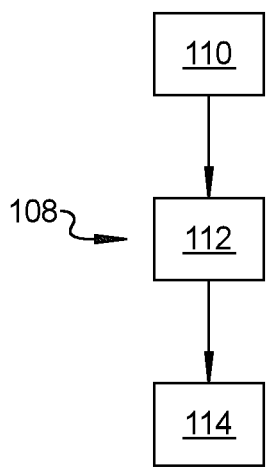
FIG. 11 is a schematic flow chart illustrating one exemplary embodiment of the method shown in FIG. 10, wherein the ego vehicle sends a challenge first, and then, the target vehicle sends an intended time of response to the challenge.

Referring to FIG. 11, in one exemplary embodiment, the initiating, with the data processor 16, via the wireless communication channel 20 and the visible light communication channel 21, a challenge-response protocol between the ego vehicle 12 and the target vehicle 14 at block 108, further includes, starting at block 110 sending, with the data processor 16 within the ego vehicle 12, via the wireless communication channel 20, a challenge to the target vehicle 14, as indicated at 32 in FIG. 6. Moving to block 112, the method 100 includes sending, with a data processor 16' within the target vehicle 14, via the wireless communication channel 20, an intended time of response to the challenge to the ego vehicle 12, as indicated at 34 in FIG. 6. Moving to block 114, the method 100 includes sending, with the data processor 16' within the target vehicle 14, via the visible light communication channel 21, a response to the ego vehicle 12, as indicated at 36 in FIG. 6.

Figure 12:
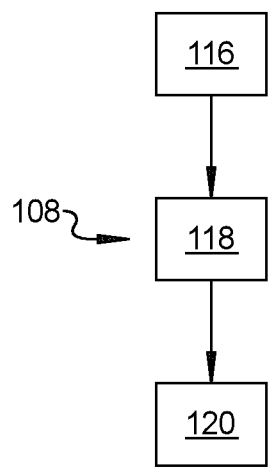
FIG. 12 is a schematic flow chart illustrating another exemplary embodiment of the method shown in FIG. 10, wherein the target vehicle sends an intended time of response to the challenge first, and then, the ego vehicle sends the challenge.

Referring to FIG. 12, in another exemplary embodiment, the initiating, with the data processor 16, via the wireless communication channel 20 and the visible light communication channel 21, a challenge-response protocol between the ego vehicle 12 and the target vehicle 14 at block 108, further includes, starting at block 116 sending, with a data processor 16' within the target vehicle 14, via the wireless communication channel 20, an intended time of response to a challenge to the ego vehicle 12, as indicated at 34 in FIG. 9. Moving to block 118, the method 100 includes sending, with the data processor 16 within the ego vehicle 12, via the wireless communication channel 20, a challenge to the target vehicle 14, as indicated at 32 in FIG. 9. Moving to block 120, the method 100 includes sending, with the data processor 16' within the target vehicle 14, via the visible light communication channel 21, a response to the ego vehicle 12, as indicated at 36 in FIG. 9. In this embodiment, the target vehicle 14 provides the identified timeslot 38 to the ego vehicle 12, before a potential imposter vehicle has a chance to intercept the challenge and potentially break any encryption. The ego vehicle 12 can wait until the identified timeslot 38 is near before sending the challenge, reducing the amount of time that a potential imposter will have to break any encryption, read and rebroadcast, thus reducing the likelihood that an imposter can successfully intercept and impersonate the target vehicle 14.

Referring again to FIG. 10, it is important that the timing between the ego vehicle 12 and the target vehicle 14 are synchronized, thus, at block 122, before the initiating, with the data processor 16, via the wireless communication channel 20 and the visible light communication channel 21, a challenge-response protocol between the ego vehicle 12 and the target vehicle 14 at block 108, the method 100 includes synchronizing, with the data processor 16 within the ego vehicle 12 and the data processor 16' within the target vehicle 14, a clock within the ego vehicle 12 with a clock within the target vehicle 14.

Moving to block 124, after synchronizing the clock within the ego vehicle 12 with the clock within the target vehicle 14, the method 100 includes dividing a timeline into timeslots 38 having a predetermined length, wherein the sending, from the target vehicle 14 to the ego vehicle 12, via the wireless communication channel 20, an intended time of response to the challenge, at blocks 112 and 116, further includes identification, by the target vehicle 14, of a timeslot 38 within which the response to the challenge will be sent.

In an exemplary embodiment, the sending, with a data processor 16' within the target vehicle 14, via the wireless communication channel 20, an intended time of response to the challenge to the ego vehicle 12, at blocks 112 and 116, further includes sending, with the data processor within the target vehicle 14, via the wireless communication channel 20, information related to the current position and movement of the target vehicle 14 to the ego vehicle 12, the method 100 further including, at the intended time of response, moving to block 126, estimating, with the data processor 16 of the ego vehicle 12, the position of the target vehicle 14, moving to block 128, identifying, with the perception sensors 24 on the ego vehicle 12, the physical identity of the target vehicle 14 based on the estimated position of the target vehicle 14, and, moving to block 130, verifying, with the data processor 16 within the ego vehicle 12, that the response from the target vehicle 14 matches an expected response.

At the intended time of response, the data processor 16 within the ego vehicle 12 is further adapted to estimate the position of the target vehicle 14 using the position and movement information previously sent by the target vehicle 14. Simultaneously, the data processor 16 within the ego vehicle 12 identifies, with the perception sensors 24, the physical identity of the target vehicle 14 based on the estimated position of the target vehicle 14. Finally, the data processor 16 of the ego vehicle 12 verifies that the response from the target vehicle 14 matches an expected response. Moving to block 132, the method 100 includes verifying If the response matches, and the response is received within the identified time slot 38.

Moving to block 134, if the response matches, and the response is received within the identified time slot 38, then the data processor 16 within the ego vehicle 12 will trust its association of the physical and virtual identities of the target vehicle 14. Moving to block 136, if the response does not match, or if the response is not received within the identified time slot 38, then the data processor 16 within the ego vehicle 12 will know that it cannot trust its association of the physical and virtual identities of the target vehicle 14.

The association between virtual channels 20, 21 and vehicles on the road is a continuous process that runs periodically. Thus, after verifying If the response matches, and the response is received within the identified time slot 38 at block 132, the method 100 loops back to block 102, as indicated at 138.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of robust association of a physical identity and a virtual identity of a target vehicle by an ego vehicle, comprising:
   collecting, with a plurality of perception sensors within the ego vehicle, data related to a physical identity of the target vehicle and communicating data related to the physical identity of the target vehicle, via a communication bus, to a data processor within the ego vehicle;
   collecting, with the data processor within the ego vehicle, via a wireless communication channel, data related to a virtual identity of the target vehicle;
   associating, with the data processor within the ego vehicle, the physical identity of the target vehicle with the virtual identity of the target vehicle; and
   initiating, with the data processor within the ego vehicle, via the wireless communication channel and a visible light communication channel, a challenge-response protocol between the ego vehicle and the target vehicle.

2. The method of claim 1, wherein the initiating, with the data processor, via the wireless communication channel and the visible light communication channel, a challenge-response protocol between the ego vehicle and the target vehicle further includes:
sending, with the data processor within the ego vehicle, via the wireless communication channel, a challenge to the target vehicle;
sending, with a data processor within the target vehicle, via the wireless communication channel, an intended time of response to the challenge to the ego vehicle; and
sending, with the data processor within the target vehicle, via the visible light communication channel, a response to the ego vehicle.

3. The method of claim 2, further including synchronizing, with the data processor within the ego vehicle and the data processor within the target vehicle, a clock within the ego vehicle with a clock within the target vehicle.

4. The method of claim 3, further including, after synchronizing the clock within the ego vehicle with the clock within the target vehicle, dividing a timeline into timeslots having a predetermined length, wherein the sending, from the target vehicle to the ego vehicle, via the wireless communication channel, an intended time of response to the challenge further includes identification, by the target vehicle, of a timeslot within which the response to the challenge will be sent.

5. The method of claim 4, wherein the sending, with a data processor within the target vehicle, via the wireless communication channel, an intended time of response to the challenge to the ego vehicle, further includes sending, with the data processor within the target vehicle, via the wireless communication channel, information related to the current position and movement of the target vehicle to the ego vehicle, the method further including, at the intended time of response:
estimating, with the data processor of the ego vehicle, the position of the target vehicle;
identifying, with the perception sensors on the ego vehicle, the physical identity of the target vehicle based on the estimated position of the target vehicle; and
verifying, with the data processor within the ego vehicle, that the response from the target vehicle matches an expected response.

6. The method of claim 5, wherein the challenge sent by the ego vehicle and the response sent by the target vehicle are encrypted with a session key using symmetric key encryption.

7. The method of claim 5, wherein the challenge sent by the ego vehicle and the response sent by the target vehicle are encrypted with public key encryption.

8. The method of claim 5, wherein the sending, with the data processor within the target vehicle, via the wireless communication channel, an intended time of response to the challenge to the ego vehicle is executed following the sending, with the data processor within the ego vehicle, via the wireless communication channel, the challenge to the target vehicle.

9. The method of claim 5, wherein the sending, with the data processor within the target vehicle, via the wireless communication channel, an intended time of response to the challenge to the ego vehicle is executed prior to the sending, with the data processor within the ego vehicle, via the wireless communication channel, the challenge to the target vehicle.

10. A system within an ego vehicle for robust association of a physical identity and a virtual identity of a target vehicle, comprising:
a data processor, including a wireless communication module and a visible light communication module, positioned within an ego vehicle; and
a plurality of perception sensors, positioned within the ego vehicle and adapted to collect data related to a physical identity of the target vehicle and to communicate the data related to the physical identity of the target vehicle to the data processor via a communication bus;
the data processor within the ego vehicle adapted to:
receive, via a wireless communication channel, data related to a virtual identity of the target vehicle;
associate the physical identity of the target vehicle with the virtual identity of the target vehicle; and
initiate, via the wireless communication channel and a visible light communication channel, a challenge-response protocol between the ego vehicle and the target vehicle.

11. The system of claim 10, wherein, when initiating, with the data processor, via the wireless communication channel and the visible light communication channel, a challenge-response protocol between the ego vehicle and the target vehicle:
the data processor within the ego vehicle is further adapted to send, via the wireless communication channel, a challenge to the target vehicle; and
a data processor within the target vehicle is adapted to:
send, via the wireless communication channel, an intended time of response to the challenge to the ego vehicle; and
send, via the visible light communication channel, a response to the ego vehicle.

12. The system of claim 11, wherein the data processor within the ego vehicle and the data processor within the target vehicle are adapted to synchronize a clock within the ego vehicle with a clock within the target vehicle.

13. The system of claim 12, wherein the data processor within the ego vehicle, after synchronizing the clock within the ego vehicle with the clock within the target vehicle, is further adapted to divide a timeline into timeslots having a predetermined length, wherein when sending, via the wireless communication channel, an intended time of response to the challenge, the data processor within the target vehicle is further adapted to identify a timeslot within which the response to the challenge will be sent.

14. The system of claim 13, wherein when sending, via the wireless communication channel, an intended time of response to the challenge, the data processor within the target vehicle is further adapted to send, via the wireless communication channel, information related to the current position and movement of the target vehicle to the ego vehicle, and, at the intended time of response, the data processor within the ego vehicle is further adapted to:
estimate the position of the target vehicle;
identify, with the perception sensors on the ego vehicle, the physical identity of the target vehicle based on the estimated position of the target vehicle; and
verify that the response from the target vehicle matches an expected response.

15. The system of claim 14, wherein the challenge sent by the ego vehicle and the response sent by the target vehicle are encrypted with a session key using symmetric key encryption.

16. The system of claim 14, wherein the challenge sent by the ego vehicle and the response sent by the target vehicle are encrypted with public key encryption.

17. The system of claim 14, wherein the data processor within the target vehicle is adapted to send, via the wireless communication channel, an intended time of response to the challenge to the ego vehicle after the data processor within the ego vehicle sends, via the wireless communication channel, the challenge to the target vehicle.

18. The system of claim 14, wherein the data processor within the target vehicle is adapted to send, via the wireless communication channel, an intended time of response to the challenge to the ego vehicle prior to the data processor within the ego vehicle sending, via the wireless communication channel, the challenge to the target vehicle.

19. A method of robust association of a physical identity and a virtual identity of a target vehicle by an ego vehicle, comprising:

collecting, with a plurality of perception sensors within the ego vehicle, data related to a physical identity of the target vehicle and communicating data related to the physical identity of the target vehicle, via a communication bus, to a data processor within the ego vehicle;

collecting, with the data processor within the ego vehicle, via a wireless communication channel, data related to a virtual identity of the target vehicle;

associating, with the data processor within the ego vehicle, the physical identity of the target vehicle with the virtual identity of the target vehicle;

synchronizing, with the data processor within the ego vehicle and the data processor within the target vehicle, a clock within the ego vehicle with a clock within the target vehicle;

dividing, with the data processor within the ego vehicle, a timeline into timeslots having a predetermined length;

initiating, with the data processor within the ego vehicle, via the wireless communication channel and a visible light communication channel, a challenge-response protocol between the ego vehicle and the target vehicle by sending, via the wireless communication channel, a challenge to the target vehicle;

sending, with a data processor within the target vehicle, via the wireless communication channel, an intended time of response to the challenge to the ego vehicle, including identification of a timeslot within which the response to the challenge will be sent and information related to the current position and movement of the target vehicle; and at the intended time of response:
sending, with the data processor within the target vehicle, via the visible light communication channel, a response to the ego vehicle;
estimating, with the data processor of the ego vehicle, the position of the target vehicle;
identifying, with the perception sensors on the ego vehicle, the physical identity of the target vehicle based on the estimated position of the target vehicle; and
verifying, with the data processor within the ego vehicle, that the response from the target vehicle matches an expected response.

20. The method of claim 5, wherein the challenge sent by the ego vehicle and the response sent by the target vehicle are encrypted with one of a session key using symmetric key encryption and public key encryption.

* * * * *